United States Patent
Hughes

(10) Patent No.: US 11,542,862 B2
(45) Date of Patent: Jan. 3, 2023

(54) EFFECT OF THE NOZZLE WIDTH TO HARNESS ON ENGINE PULSE ENERGY

(71) Applicant: Cummins Ltd, London (GB)

(72) Inventor: Stephen David Hughes, Huddersfield (GB)

(73) Assignee: CUMMINS LTD, London (GB)

( * ) Notice: Subject to any disclaimer, the term of this patent is extended or adjusted under 35 U.S.C. 154(b) by 83 days.

(21) Appl. No.: 16/766,775

(22) PCT Filed: Nov. 22, 2018

(86) PCT No.: PCT/GB2018/053381
§ 371 (c)(1),
(2) Date: May 26, 2020

(87) PCT Pub. No.: WO2019/102200
PCT Pub. Date: May 31, 2019

(65) Prior Publication Data
US 2020/0300160 A1   Sep. 24, 2020

(30) Foreign Application Priority Data

Nov. 24, 2017 (GB) ...................... 1719591

(51) Int. Cl.
*F02C 6/12* (2006.01)
*F01D 9/02* (2006.01)
(Continued)

(52) U.S. Cl.
CPC ................ *F02C 6/12* (2013.01); *F01D 9/026* (2013.01); *F01D 17/143* (2013.01);
(Continued)

(58) Field of Classification Search
CPC ...... F01D 17/143; F01D 9/026; F02B 37/025; F02C 6/12; F04D 29/4233; F05D 2220/40;
(Continued)

(56) References Cited

U.S. PATENT DOCUMENTS 8,721,268 B2 * 5/2014 Moore ................. F01D 17/143
415/158
9,234,456 B2 * 1/2016 Parker ..................... F02B 37/22
(Continued)

FOREIGN PATENT DOCUMENTS

EP   3117078 A1   1/2017
GB   709211       5/1954
(Continued)

OTHER PUBLICATIONS

JPH04111528 translation, 1991.*
(Continued)

*Primary Examiner* — Jesse S Bogue
(74) *Attorney, Agent, or Firm* — Faegre Drinker Biddle & Reath LLP

(57) ABSTRACT

A turbine comprises a turbine wheel for rotation within a turbine housing, the turbine housing including at least one volute arranged to deliver a fluid to the turbine wheel via the turbine nozzle. A method for determining a width of a turbine nozzle for the turbine, comprises selecting from a relationship between a turbine stage efficiency and an effective nozzle area, at least one target effective nozzle area. As used here, the effective nozzle area is dependent on both the width of the turbine nozzle and a whirl angle induced by the at least one volute. The method further comprises determining, in dependence on the whirl angle, the width of the turbine nozzle as a width that will achieve the at least one target effective nozzle area.

21 Claims, 11 Drawing Sheets

(51) Int. Cl.
  *F01D 17/14* (2006.01)
  *F02B 37/02* (2006.01)
  *F04D 29/42* (2006.01)
(52) U.S. Cl.
  CPC ........ *F02B 37/025* (2013.01); *F04D 29/4233* (2013.01); *F05D 2220/40* (2013.01); *F05D 2240/24* (2013.01); *F05D 2250/51* (2013.01); *F16C 2360/24* (2013.01)
(58) Field of Classification Search
  CPC ............. F05D 2240/24; F05D 2250/51; F16C 2360/24; Y02T 10/12
  See application file for complete search history.

(56) References Cited

U.S. PATENT DOCUMENTS

| | | | | |
|---|---|---|---|---|
| 10,487,676 | B2* | 11/2019 | Hughes | F01D 9/026 |
| 2005/0056015 | A1* | 3/2005 | Fledersbacher | F01D 17/167 |
| | | | | 60/602 |
| 2011/0079009 | A1 | 4/2011 | Kratschrner et al. | |
| 2014/0003910 | A1 | 1/2014 | Brinkert et al. | |
| 2014/0338328 | A1* | 11/2014 | Lusardi | F01D 9/047 |
| | | | | 60/605.2 |
| 2014/0370412 | A1* | 12/2014 | Sumser | F02C 6/12 |
| | | | | 429/446 |
| 2017/0022830 | A1* | 1/2017 | Hughes | F01D 25/24 |
| 2019/0323368 | A1* | 10/2019 | Yoshida | F02B 39/00 |
| 2020/0217212 | A1* | 7/2020 | Keating | F02B 37/025 |
| 2020/0380180 | A1* | 12/2020 | Hasler | F02D 41/0007 |

FOREIGN PATENT DOCUMENTS

| | | |
|---|---|---|
| GB | 2123483 A | 1/1984 |
| JP | H04111528 U | 9/1992 |
| WO | 2010068558 A2 | 6/2010 |

OTHER PUBLICATIONS

Search Report issued by the United Kingdom Intellectual Property Office, dated Apr. 26, 2018, for related application GB1719591.8; 4 pages.

International Search Report and Written Opinion issued by the European Patent Office, dated Feb. 13, 2019, for International Application No. PCT/GB2018/053381; 19 pages.

International Preliminary Report on Patentability received for PCT Patent Application No. PCT/GB2018/053381, dated Jun. 4, 2020, 7 pages.

* cited by examiner

EFFECT OF THE NOZZLE WIDTH TO HARNESS ON ENGINE PULSE ENERGY

CROSS-REFERENCE TO RELATED APPLICATIONS

The present application is a national phase filing under 35 U.S.C. § 371 of International Application No. PCT/GB2018/053381, filed on Nov. 22, 2018, which claims the benefit of priority to British Patent Application No. 1719591.8, filed with the United Kingdom Intellectual Property Office on Nov. 24, 2017, the entire disclosures of which being expressly incorporated herein by reference.

FIELD OF THE DISCLOSURE

The present disclosure relates to a method of designing a turbine. In particular, it relates to the design of a turbine housing for a turbocharger.

BACKGROUND OF THE DISCLOSURE

Turbomachines are machines that transfer energy between a rotor and a fluid. For example, a turbomachine may transfer energy from a fluid to a rotor or may transfer energy from a rotor to a fluid. Two examples of turbomachines are a power turbine, which uses the rotational energy of a rotor driven by a fluid to do useful work, for example, generating electrical power; and a compressor which uses the rotational energy of the rotor to compress a fluid.

Turbochargers are known turbomachines for supplying air to an inlet of an internal combustion engine at pressures above atmospheric pressure (boost pressures). A conventional turbocharger comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to an engine inlet manifold.

The turbocharger shaft is conventionally supported by journal and thrust bearings, including appropriate lubricating systems, located within a central bearing housing connected between the turbine and compressor wheel housings. After driving the turbine wheel the exhaust gas exists the turbine through a gas outlet which is at the opposite end of the rotational axis of the turbine wheel from the bearing housing.

It is known for the multiple cylinders of an internal combustion engine to be portioned into two groups of cylinders, and for the exhaust gas emitted by the respective groups of cylinders to be transmitted into two respective gas inlets of a turbocharger. The gas inlets are in fluid communication with a chamber of the housing containing the turbine wheel via respective volutes. The volutes are spaced from each other along the rotational axis of the turbine wheel, such that a first of the volutes is closer to the bearing housing (the "bearing housing side volute"—BH), and the other is closer to the turbine outlet side (the "turbine outlet side volute"—TO). The inlets to the volutes may be circumferentially-spaced from each other about the rotational axis of the turbine wheel ("double-entry" volutes), or axially-spaced but not circumferentially-spaced ("twin-entry" volutes).

It may be desirable to provide a new method for designing turbines for turbochargers that at least partially addresses one or more problems associated with prior art methods, whether identified here on not.

SUMMARY OF THE DISCLOSURE

According to a first aspect of the disclosure, there is provided a method for determining a width of a turbine nozzle for a turbine, the turbine comprising a turbine wheel for rotation within a turbine housing, the turbine housing including at least one volute arranged to deliver a fluid to the turbine wheel via the turbine nozzle, the method comprising: selecting from a relationship between a turbine stage efficiency and an effective nozzle area, at least one target effective nozzle area, wherein the effective nozzle area is dependent on both the width of the turbine nozzle and a whirl angle induced by the at least one volute; and determining in dependence on the whirl angle, the width of the turbine nozzle as a width that will achieve the at least one target effective nozzle area.

The method according to the first aspect of the disclosure is advantageous since it uses a newly defined effective nozzle area, which allows the turbine stage efficiency to be simultaneously optimised for both the width of the turbine nozzle and the whirl angle induced by the at least one volute. The inventor has realised that the dependence of the turbine stage efficiency on both: (a) the width of the turbine nozzle and the whirl angle induced by the at least one volute (which, in turn, can depend both on the geometry of the turbine housing and turbine wheel and, for twin-volute turbine housings, on the operating conditions).

It will be appreciated that the efficiency of the turbine stage (i.e. the combination of the turbine housing and the turbine wheel) will, in general, be dependent on a wide range of parameters, which characterize the size and shape of the turbine wheel and the turbine housing.

It will be further appreciated that many of these parameters may have been selected based upon one or more design constraints. For example, the geometry of the at least one volute (which may be at least partially characterised by a critical area and a ratio of the cross sectional area of the volute to the radius of the centroid of the volute) may have been selected based upon one or more design constraints or desired set points. Similarly, the geometry of the turbine wheel (which may be at least partially characterised by a critical area and of the turbine wheel and a width of the turbine wheel tip) may have been selected, for example using known matching techniques.

With the other parameters of the turbine stage having been selected in this way, the method according to the first aspect of the disclosure may be used to selecting a width of the turbine nozzle (i.e. a dimension which defines the outlet passage(s) of the at least one volute).

The effective nozzle area provides a novel parameter that can be used to optimise the performance of a turbine stage.

The method may further comprise determining the relationship between the turbine stage efficiency and the effective nozzle area from which the at least one target effective nozzle area is determined.

For example, the relationship between the turbine stage efficiency and an effective nozzle area from which the at least one target effective nozzle area may be determined by simulating a range of different set points, the set points having a range of different effective nozzle areas. However, it will be appreciated that such a relationship may be determined once and subsequently used for determining a plurality of widths of a turbine nozzle for a turbine. That is, the relationship need not be determined for each turbine nozzle width determination.

The effective nozzle area may be proportional to a product of the width of the turbine nozzle and a cosine of the whirl angle.

The turbine may be a twin-volute turbine comprising two volutes.

The effective nozzle area is dependent on both the geometric area of the at least one nozzle and the whirl angle.

For a twin-volute turbine comprising two volutes, the geometric cross sectional area of the volutes is the total cross sectional area that is supporting exhaust gas flow. This will depend on the operating since, when under equal admission conditions, this area is the sum of the cross sectional areas of the two volutes, whereas when operating under single admission with flow only through one of the volutes this area is equal to the cross sectional area of one of the two volutes. The whirl angle is dependent on the geometry of the at least one volute, the geometry of the turbine wheel and, in the case of poor separation between the two volutes of a twin-volute turbine, the flow conditions (i.e. whether the turbine stage operates under equal admission or single admission).

Determining the width of the turbine nozzle in dependence on the whirl angle may involve determining the width of the turbine nozzle in dependence on the whirl angle for a set point of flow conditions as a width that will achieve the at least one target effective nozzle area for said set point of flow conditions.

It will be appreciated that, as used in this context, a set point of flow conditions is intended to mean a set point selected from a range of flow conditions between two end points of flow conditions, the end points of flow conditions being equal admission and single admission.

In some embodiments, a range of target effective nozzle areas may be selected from the relationship between the turbine stage efficiency and the effective nozzle area.

It will be appreciated that, the range of target effective nozzle areas may correspond to a range of set points of flow conditions (selected from a range of flow conditions between two end points of flow conditions, the end points of flow conditions being equal admission and single admission).

It will be appreciated that in general, for a twin-volute turbine, this range of target effective nozzle areas will, in general, be selected bearing in mind: the geometry of the two volutes, the geometry of the turbine wheel the range of flow conditions under which the turbine is expect to operate in during use. For example, it will be appreciated that, in general, a different the range may be selected for a turbine that is expected to operate mainly in equal admission to a turbine that is expected to operate mainly in single admission. The relationship between the turbine stage efficiency and the effective nozzle area may comprise a relationship between the turbine stage efficiency and a ratio of: (a) the effective nozzle area to (b) a wheel throat area.

According to a second aspect of the disclosure there is provides a method for determining a width of a turbine nozzle for a turbine, the turbine comprising a turbine wheel for rotation within a turbine housing, the turbine housing including at least one volute arranged to deliver a fluid to the turbine wheel via the turbine nozzle, the method comprising: determining in dependence on whirl angle induced by the at least one volute, the width of the turbine nozzle as a width that will achieve an ratio of an effective nozzle area to a wheel throat area in the range 0.4 to 1.0, wherein the effective nozzle area a product of the width of the turbine nozzle and a cosine of the whirl angle.

The method according to the second aspect of the disclosure is advantageous since it optimises turbine stage efficiency.

More preferably, the width of the turbine nozzle may be determined such that the ratio of effective nozzle area to wheel throat area in the range 0.5 to 0.9. Even more preferably, the width of the turbine nozzle may be determined such that the ratio of effective nozzle area to wheel throat area in the range 0.6 to 0.8. Even more preferably, the width of the turbine nozzle may be determined such that the ratio of effective nozzle area to wheel throat area is approximately 0.7.

The turbine may be a twin-volute turbine comprising two volutes.

The effective nozzle area is dependent on both the geometric area of the at least one nozzle and the whirl angle.

For a twin-volute turbine comprising two volutes, the geometric cross sectional area of the volutes is the total cross sectional area that is supporting exhaust gas flow. This will depend on the operating since, when under equal admission conditions, this area is the sum of the cross sectional areas of the two volutes, whereas when operating under single admission with flow only through one of the volutes this area is equal to the cross sectional area of one of the two volutes.

The whirl angle is dependent on the geometry of the at least one volute, the geometry of the turbine wheel and, in the case of poor separation between the two volutes of a twin-volute turbine, the flow conditions (i.e. whether the turbine stage operates under equal admission or single admission).

The width of the turbine nozzle may be determined so as to achieve an ratio of an effective nozzle area to a wheel throat area in the range 0.4 to 1.0 for a range of flow conditions between two end points of flow conditions, the end points of flow conditions being equal admission and single admission.

According to a third aspect of the disclosure there is provided a computer readable medium carrying a computer program comprising computer readable instructions configured to cause a computer to carry out a method according to the first or second aspects of the disclosure.

According to a fourth aspect of the disclosure there is provided a computer apparatus comprising: a memory storing processor readable instructions, and a processor arranged to read and execute instructions stored in said memory, wherein said processor readable instructions comprise instructions arranged to control the computer to carry out the method according to the first or second aspects of the disclosure.

BRIEF DESCRIPTION OF THE DRAWINGS

A non-limiting embodiment of the disclosure will now be described, for the sake of example only, with reference to the following figures, in which.

DETAILED DESCRIPTION OF THE EMBODIMENTS

Figure 1:
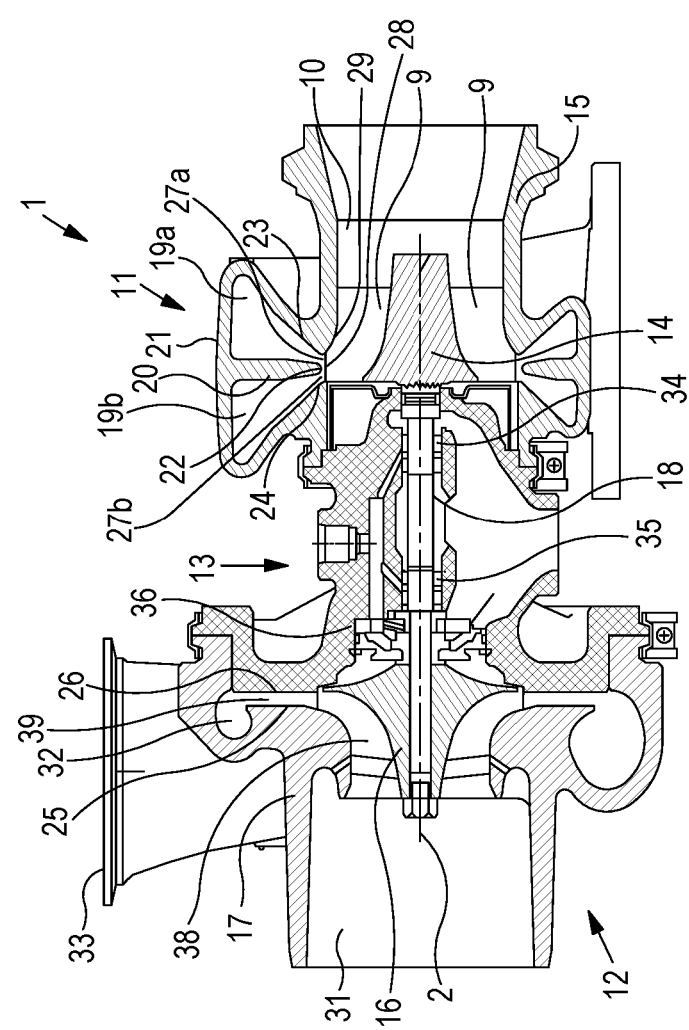
FIG. 1 is a cross-sectional drawing of a known turbocharger.
Figure 2:
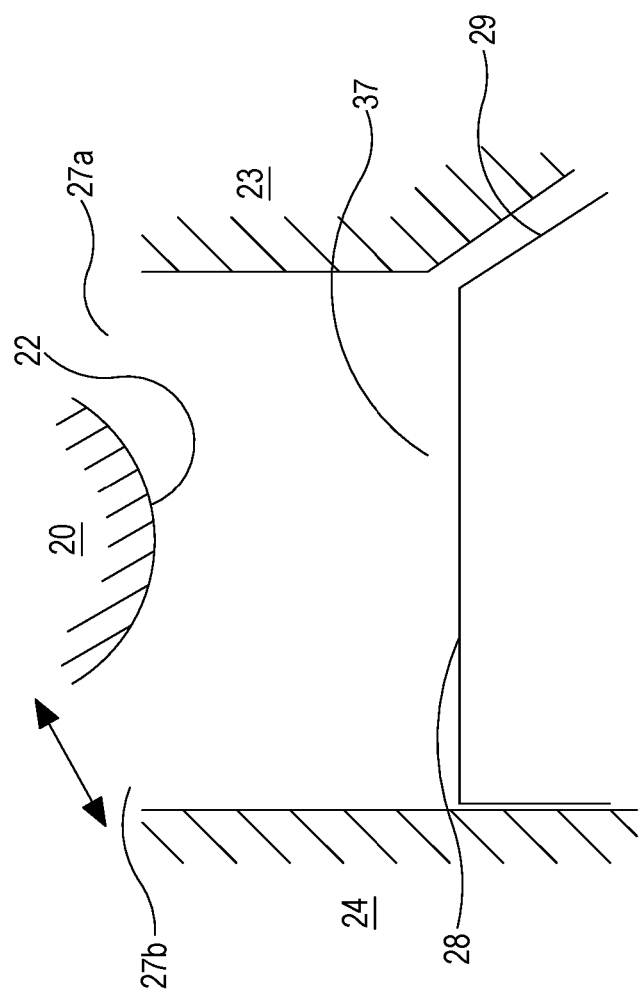
FIG. 2 shows a dummy section used to represent the turbine housing nozzle width for a twin-volute turbine and a tip portion of a turbine blade.

FIG. 1 shows a schematic cross-section through a known turbocharger 1. The turbocharger 1 comprises a turbine 11 joined to a compressor 12 via a central bearing housing 13. The turbine 11 comprises a turbine wheel 14 for rotation within a turbine housing 15. The turbine wheel 14 has a rotational axis 2 (in the plane of the diagram) and blades 9. Similarly, the compressor 12 comprises a compressor wheel 16 (or "impeller") which can rotate within a compressor housing 17. The compressor housing 17 defines a compressor chamber 38 which is largely filled by the compressor wheel 16, and within which the compressor wheel 16 can rotate. The turbine wheel 14 and compressor wheel 16 are mounted on opposite ends of a common turbocharger shaft 18 which extends through the central bearing housing 13. The turbocharger shaft 18 is rotatably supported by a bearing assembly in the bearing housing 13 which comprises two journal bearings 34 and 35 housed towards the turbine end and compressor end respectively of the bearing housing 13. The bearing assembly further includes a thrust bearing 36. The turbine housing 15 has two exhaust gas inlet volutes 19a, 19b located annularly around the turbine wheel 14, and an axial exhaust gas outlet 10. The axial exhaust gas outlet 10 is defined by a generally cylindrical exit portion 30 of the turbine housing 15. The volutes 19a, 19b are symmetrical with respect to each other in a mirror plane perpendicular to the axial direction (note that in other known turbine housings the volutes are not symmetrical; furthermore in "double entry" turbines the volutes are circumferentially spaced, such as by 180 degrees, about the rotational axis 2 of the turbine). The compressor housing 17 has an axial air intake passage 31 and a volute 32 arranged annularly around the compressor chamber 38. The volute 32 is in gas flow communication with a compressor outlet 33. The compressor chamber 38 is connected to the volute 32 by a radially-extending diffuser space 39 (also referred to here as a "diffuser") which is a gap between a radially-extending shroud surface 25 of the housing 17, and a radially extending hub surface 26 of the bearing housing 13. The diffuser 39 is rotationally symmetric about the rotational axis 2 of the shaft 18.

In use, exhaust gas is provided to the two exhaust gas inlet volutes 19a, 19b from an exhaust manifold (also referred to as an outlet manifold) of the engine (not shown) to which the turbocharger is attached. The inlet volutes 19a, 19b are divided by a divider wall 20 which extends radially inwardly from the radially outer wall 21 of the turbine housing 15, to a tip 22. The exhaust gas exits volute 19a through a gap 27a between the divider wall 20 and a first shroud surface 23 of the turbine 11. The exhaust gas exits volute 19b through a gap 27b between the divider wall 20 and a second shroud surface 24 of the turbine 11. In variants, the second shroud 24 surface may be provided as a surface of the bearing housing or some other component, instead of being a surface of the turbine housing 15. Each of the gaps 27a, 27 between the divider wall 20 and the first and second shroud surfaces 23, 24 of the turbine 11 defines an outlet passage of one of the volutes 19a, 19b.

The turbine blades 9 extend generally radially outwards from a radially inner hub of the turbine wheel 14. An outer radial edge of the turbine blades 9 comprises a generally flat, first portion, which is adjacent to the bearing housing 13 and which defines a turbine wheel tip 28. A second portion 29 of the outer radial edge of the turbine blades 9, which is distal from the bearing housing 13, is curved and has a shape that is generally complimentary to an inner surface of exit portion 30 of the turbine housing 15. In use, the second portion 29 of the outer radial edge of the turbine blades 9 sweeps across said an inner surface of exit portion 30 of the turbine housing 15 with as small a clearance between these components as possible.

Exhaust gasses flowing out of the gas inlet volutes 19a, 19b via gaps 27a, 27b flows thought a gap 37 defined between the first shroud surface 23 and the second shroud surface 24 of the turbine 11. In use, the turbine wheel tip 28 sweeps over the gap 37. Thus, the exhaust gas passes from the exhaust gas inlet volutes 19a, 19b, via gaps 27a, 28b and gap 37 onto turbine wheel tip 28. The exhaust gas flows over the turbine wheel 14 (between the blades 9) to the exhaust gas outlet 10. The turbine blades 9 are shaped so that this flow of exhaust gas acts on the turbine wheel 15 and causes it to rotate about rotational axis 2.

The turbine wheel 14 in turn rotates the compressor wheel 16 which thereby draws intake air through the compressor inlet 31 and delivers boost air to an inlet manifold of the engine via the diffuser 39, the volute 32 and then the outlet 33.

As gas passes through the turbine stage it undergoes an expansion process from a first pressure and temperature to a second (lower) pressure and temperature. The efficiency of the turbine stage may be defined as the ratio between the actual power produced by the real machine under given conditions of massflow, temperature and pressure to the power that would be produced by an ideal or perfect machine under the same operating conditions. It will be appreciated that the expansion process for the ideal machine is an isentropic process (i.e. there is no change in entropy) and hence is without losses.

Embodiments of the present disclosure relate to methods for designing the part of the turbine housing which provides a passageway between each of the two exhaust gas inlet volutes 19a, 19b and the turbine wheel 15. In particular, it relates to methods for selecting a width of the gaps 27a, 27b which define the outlet passages of the volutes 19a, 19b.

It will be appreciated that the efficiency of the turbine stage will, in general, be dependent on a wide range of parameters of the turbine wheel 14 and the turbine housing 15, which characterize the size and shape of the turbine wheel 14 and the turbine housing 15. As used here, the term turbine stage is intended to refer to the combination of the turbine housing 15 and the turbine wheel 14.

It will be further appreciated that many of these parameters may have been selected based upon one or more design constraints. For example, the geometry of the volutes 19a, 19b and the critical area of the turbine housing 15 may have been selected based upon one or more design constraints or desired set points. As used here, the critical area of the turbine housing 15 is the cross-sectional area of the volutes 19a, 19b measured at a plane that intersects the rotational axis 2 of the turbocharger 1 where the combined cross-sectional area of the volutes 19a, 19b is at its smallest, upstream of the gaps 27a, 27b. Furthermore, the parameters of the turbine wheel 14 may have been selected, for example using known matching techniques, to achieve desired set point. These parameters include, for example, the critical area and of the turbine wheel 14 and the width of the turbine wheel tip 28. The critical area and of the turbine wheel 14 is defined as the smallest area along the meridional length of the wheel (that is, along the flow path defined between the blades) transverse to the flow path. This is usually located in the exducer of the wheel. The critical area and of the turbine wheel 14 may alternatively be referred to as the wheel throat area.

With the other parameters of the turbine stage having been selected in this way, embodiments of the disclosure are concerned with the selecting a width of a width of the gaps 27a, 27b which define the outlet passages of the volutes 19a, 19b. In the following, the gaps 27a, 27b which define the outlet passages of the volutes 19a, 19b may be referred to as nozzles. It will be appreciated that as used in this context, the term nozzle refers to a position in a passage which represents a local minimum in cross sectional area of a flow path of the exhaust gases through the turbine stage.

Whilst it is known to consider the critical areas of the turbine housing 15 and the turbine wheel 14, it is not known in the art to consider the impact of the width of the gaps 27a, 27b which define the outlet passages of the volutes 19a, 19b on efficiency of the turbine stage. However, the inventor has realised that by suitable selection of the width of the gaps 27a, 27b which define the outlet passages of the volutes 19a, 19b the efficiency of the turbine stage can be optimized.

Furthermore, the inventor has realised that such optimization can be improved by considering the width of the gaps 27a, 27b which define the outlet passages of the volutes 19a, 19b in combination with other parameters of the turbine housing 15, in particular the whirl angle induced by the volutes 19a, 19b.

As exhaust gases pass through the volutes 19a, 19b, the volutes 19a, 19b induce a whirl such that the exhaust gases passing through the gap 37 and onto the turbine wheel tip 28 are not moving only in a radial direction (with respect to the rotational axis 2) but also has a circumferential component. The angle between the radial direction and the velocity vector of the exhaust gas is the whirl angle $\theta_w$.

The whirl angle (for equal admission) is given by:

$$\theta_W = \tan^{-1}\left(\frac{A_V/\langle r_V \rangle}{A_W/\langle r_W \rangle}\right) \quad (1)$$

where $A_v/(r_v)$ is the ratio of the cross sectional area of the volutes 19a, 19b of the turbine housing 15 to the radius of the centroid of the volute and $A_w/(r_w)$ is the ratio of the cross sectional area of the turbine blade tip 28 to the radius of the turbine blade tip 28.

In order to study the impact of both the width of the gaps 27a, 27b which define the outlet passages of the volutes 19a, 19b and the whirl angle $\theta_w$ on efficiency of the turbine stage a so-called "wheel only analysis" was carried out with a dummy section to represent the turbine housing nozzle 27a, 27b widths. That is, wherein exhaust gas flows with multiple different whirl angles were simulated and the effects of these exhaust gas flows flowing over a turbine wheel 15 were studied (without having to select a volute geometry that would achieve such a whirl angle for that wheel).

Three different nozzle widths (for gaps 27a, 27b) were simulated and, for each different nozzle width, three different whirl angles were simulated. The nozzle widths used were 3.5, 5.5 and 7 mm. The whirl angles used where 60, 67.5 and 75 degrees.

Figure 3:
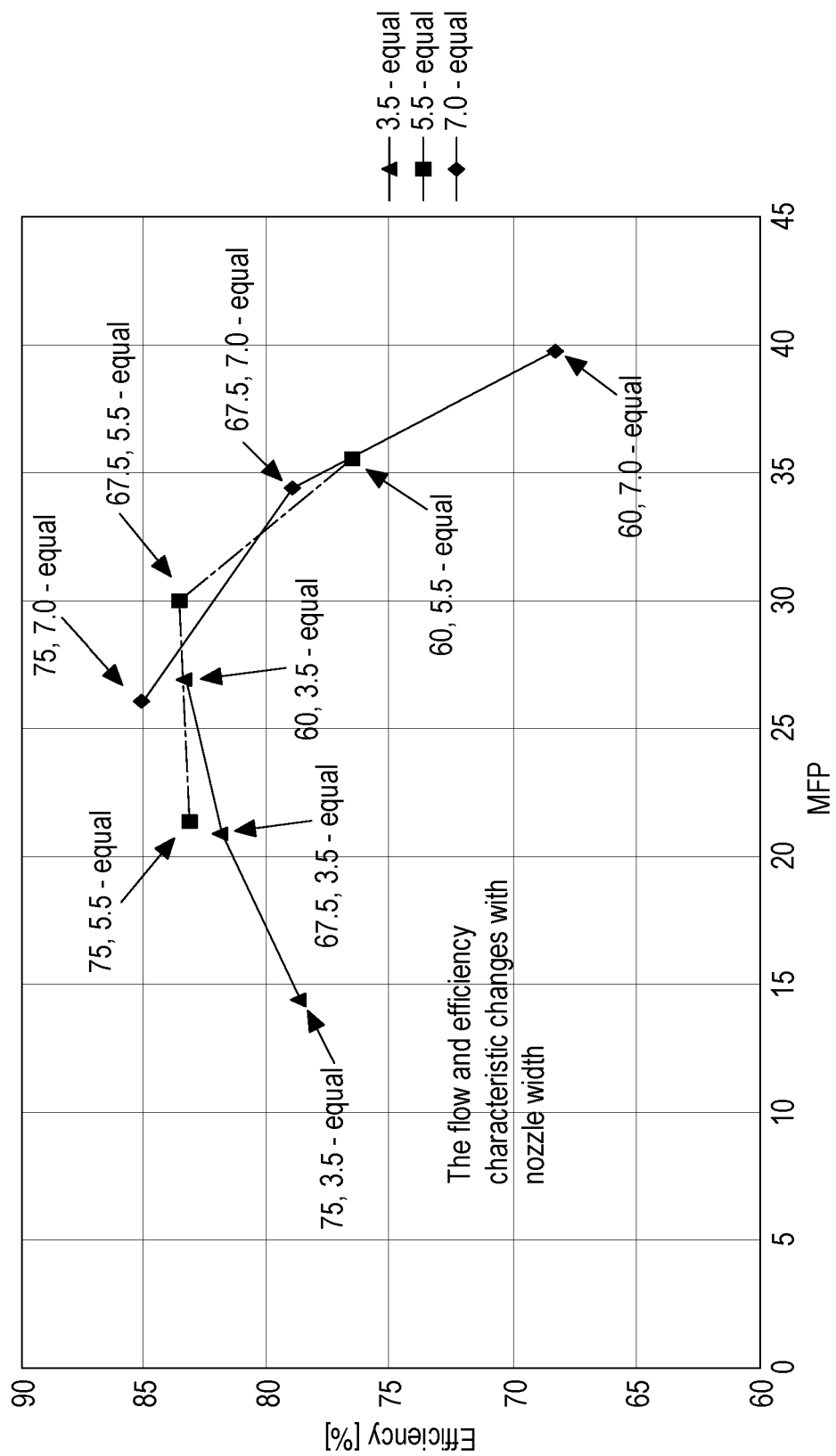
FIG. 3 shows curves of the efficiency of the turbine stage as a function of mass flow parameter (MFP) for three different nozzle widths when the two volutes of a twin-volute turbine are operating under equal admission conditions.

FIG. 3 shows curves of the efficiency of the turbine stage as a function of mass flow parameter (MFP) for each of the three different nozzle widths when the two volutes 19a, 19b are operating under equal admission conditions. Here the (dimensionless) mass flow parameter is defined as:

$$MFP = \frac{\dot{m}\sqrt{T}}{P} \quad (2)$$

where $\dot{m}$ is the mass flow rate of exhaust gas (for example in units of Kg/s), T is the temperature and P is the pressure.

It will be appreciated that, in use, each of the two volutes 19a, 19b will be connected to a different set of cylinders of an internal combustion engine such that pulses of exhaust gas generated by the internal combustion engine are directed alternately to volute 19a and volute 19b. Depending on the operating conditions of the engine and turbocharger 1, as a pulse of exhaust gas passes through one volute 19a it may affect the flow of gas through the other volute 19b. A range of operating conditions may exist. In one extreme, the pressure differentials across the two volutes 19a, 19b may be such that as a pulse of exhaust gas passes through one volute 19a the flow of gas through the other volute 19b is unaffected. This is known as equal admission. At the other extreme, the pressure differentials across the two volutes 19a, 19b may be such that as a pulse of exhaust gas passes through one volute 19a the flow of gas through the other volute 19b ceases until the next pulse passes through the other volute 19b (at which time the flow through volute 19a ceases). This is known as single admission. In general, the turbine may operate somewhere in between these two extreme conditions.

Figure 4:
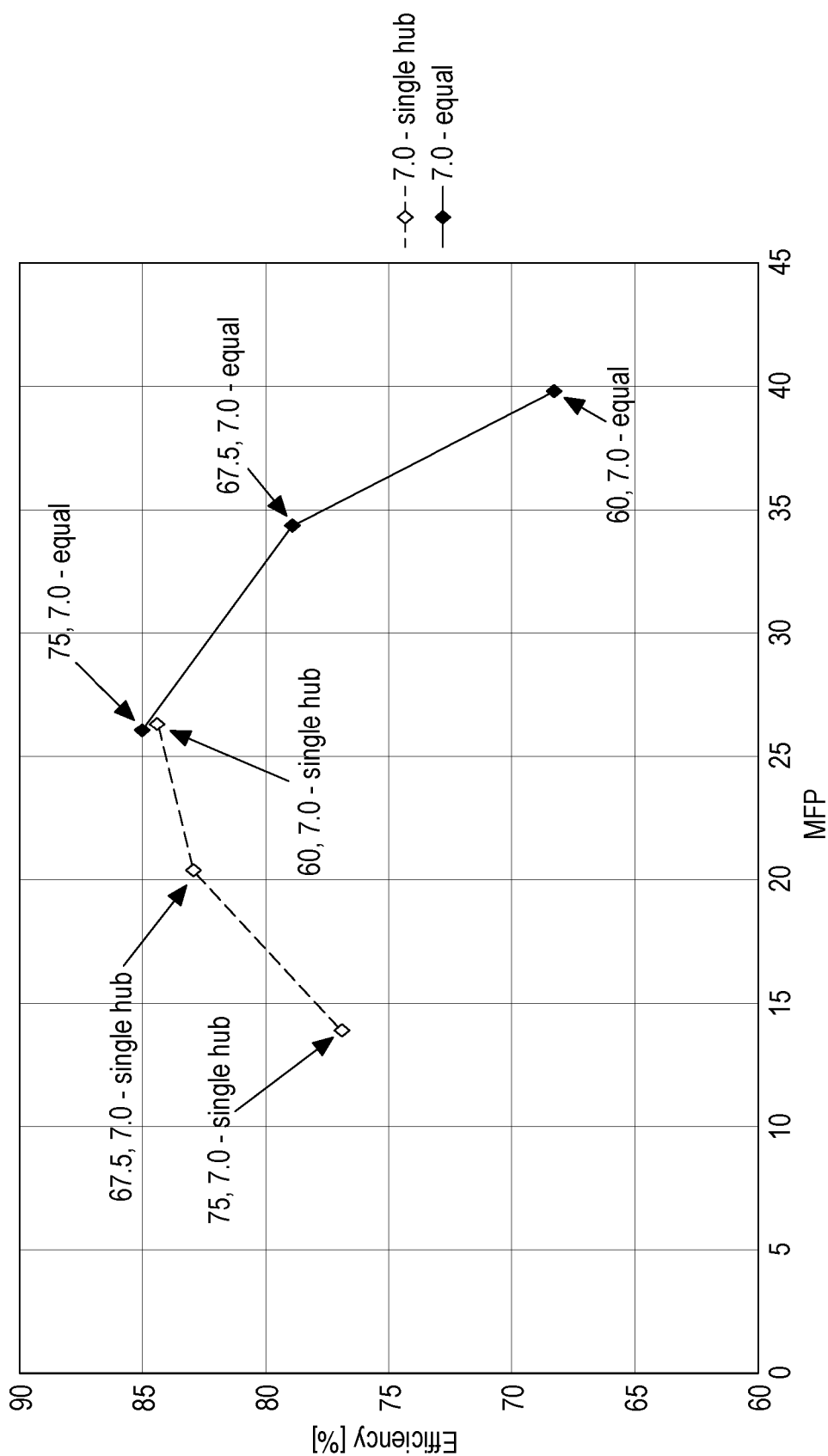
FIG. 4 shows curves of the efficiency of the turbine stage as a function of mass flow parameter (MFP) for a single nozzle width (7 mm) under two operating conditions: equal admission (solid line), single admission with flow only through the volute proximate to the bearing housing (dashed line)

The efficiency curves for each of the three different nozzle widths shown in FIG. 3 are for the turbine operating under equal admission conditions. FIG. 4 shows curves of the efficiency of the turbine stage as a function of mass flow parameter (MFP) for a single nozzle width (7 mm) under two operating conditions: equal admission (solid line) and single admission with flow only through the volute 19b proximate to the bearing housing 13 (dashed line).

Figure 5:
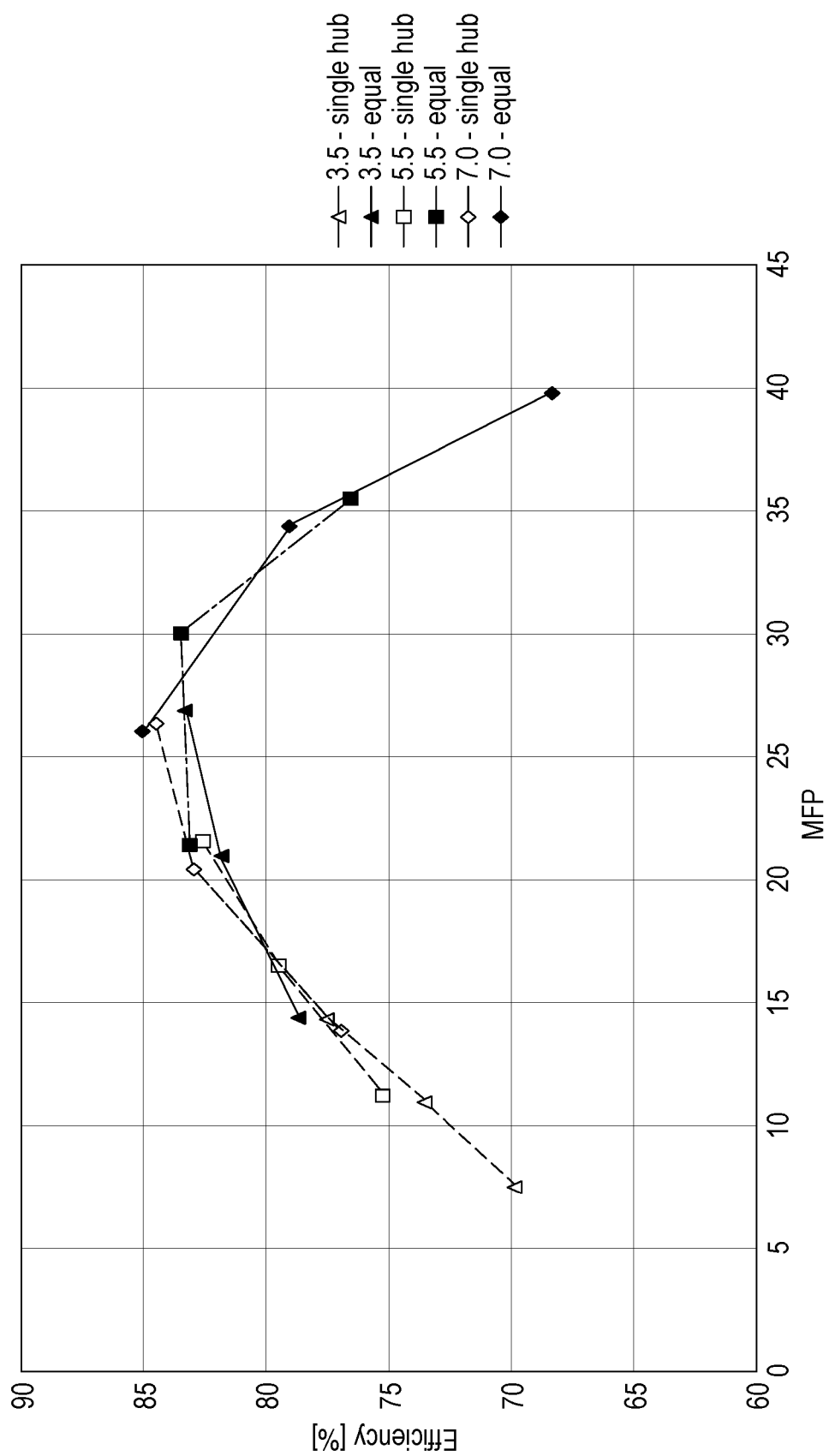
FIG. 5 shows curves of the efficiency of the turbine stage as a function of mass flow parameter (MFP) for each of the three nozzle widths and for each of the two operating conditions: equal admission and single admission with flow only through the volute proximate to the bearing housing.

FIG. 5 shows curves of the efficiency of the turbine stage as a function of mass flow parameter (MFP) for each of the three nozzle widths and for each of the two operating conditions: equal admission and single admission with flow only through the volute 19b proximate to the bearing housing 13. It can be seen that all of these set points taken together lie generally on an efficiency against mass flow parameter curve for this turbine wheel. Moving from right to left on this curve can be achieved by: reducing the nozzle widths and/or by increasing the whirl angle induced by the volutes.

As explained above, the whirl angle of exhaust gas as it exits the volutes 19a, 19b is dependent on the geometry of both the turbine housing 15 and the turbine wheel 14 (see equation (1)). In particular $\tan(\theta_w)$ is proportional to the ratio of the cross sectional area of the volutes 19a, 19b of the turbine housing 15 to the cross sectional area of the turbine wheel tip 28.

Here, what is meant by the cross sectional area of the volutes 19a, 19b of the turbine housing 15 is the total cross sectional area that is supporting exhaust gas flow. When operating under equal admission conditions, this area is the sum of the cross sectional areas of the two volutes 19a, 19b. However, when operating under single admission with flow only through one of the volutes 19a, 19b, this area is equal to the cross sectional area of one of the two volutes 19a, 19b. Therefore, when moving from equal admission to single admission, the cross sectional area of the volutes 19a, 19b is effectively halved.

Again, in equation (1), what is meant by the cross sectional area of the turbine wheel tip 28 is the cross sectional area of the turbine wheel tip 28 that is supporting exhaust gas flow. When moving from equal admission to single admission, whether or not the cross sectional area of the turbine wheel tip 28 changes is dependent on how well the two volutes 19a, 19b are separated by the divider wall 20, as now discussed.

If there is a sufficiently large distance between the tip 22 of the divider wall 20 and the turbine wheel tip 28 then even when operating in a single admission regime (with, at any given moment, exhaust gases flowing through only one volute 19a, 19b) the exhaust gas will still be incident on the entire turbine wheel tip 28 (via gap 37). In this case, the cross sectional area of the volutes 19a, 19b in equation (1) is halved but the cross sectional area of the turbine wheel tip 28 remains the same. Therefore, the whirl angle will increase as the turbine moves from equal admission to single admission.

However, in the limit that the distance between the tip 22 of the divider wall 20 and the turbine wheel tip 28 becomes vanishingly small then when operating in a single admission regime (with, at any given moment, exhaust gases flowing through only one volute 19a, 19b) the exhaust gas is only incident on half of the turbine wheel tip 28 (via gap 37). In this case, both the cross sectional area of the volutes 19a, 19b and the cross sectional area of the turbine wheel tip 28 in equation (1) are halved. Therefore, with this better volute 19a, 19b separation the whirl angle will be substantially the same under equal admission and single admission conditions.

Figure 6:
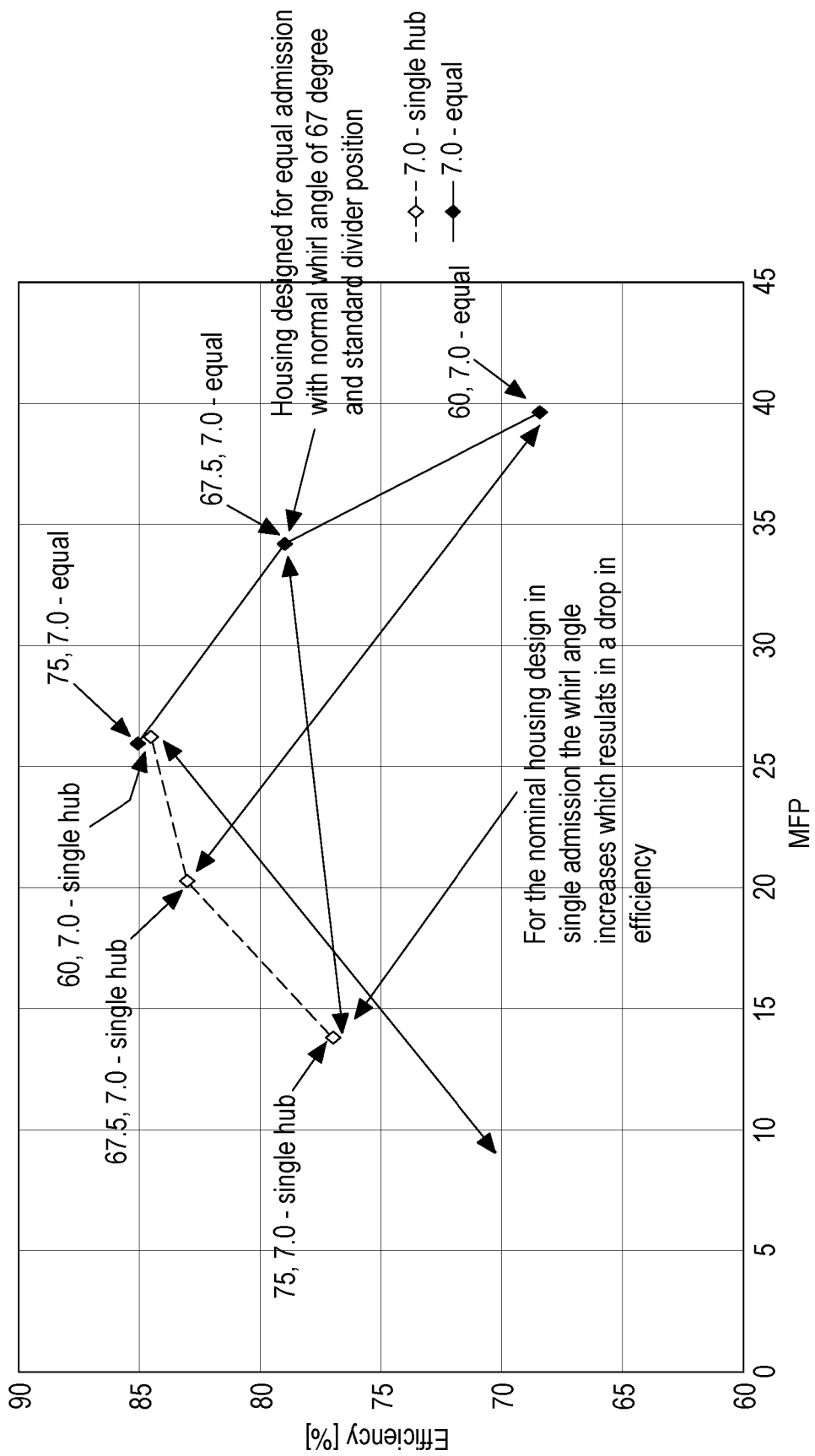
FIG. 6 shows the same curves of the efficiency of the turbine stage as a function of mass flow parameter (MFP) as shown in FIG. 5 with arrows added to show how points on the solid line (which represents equal admission) map onto points on the dashed line (which represents single admission) when there is poor separation between the two volutes.
Figure 7:
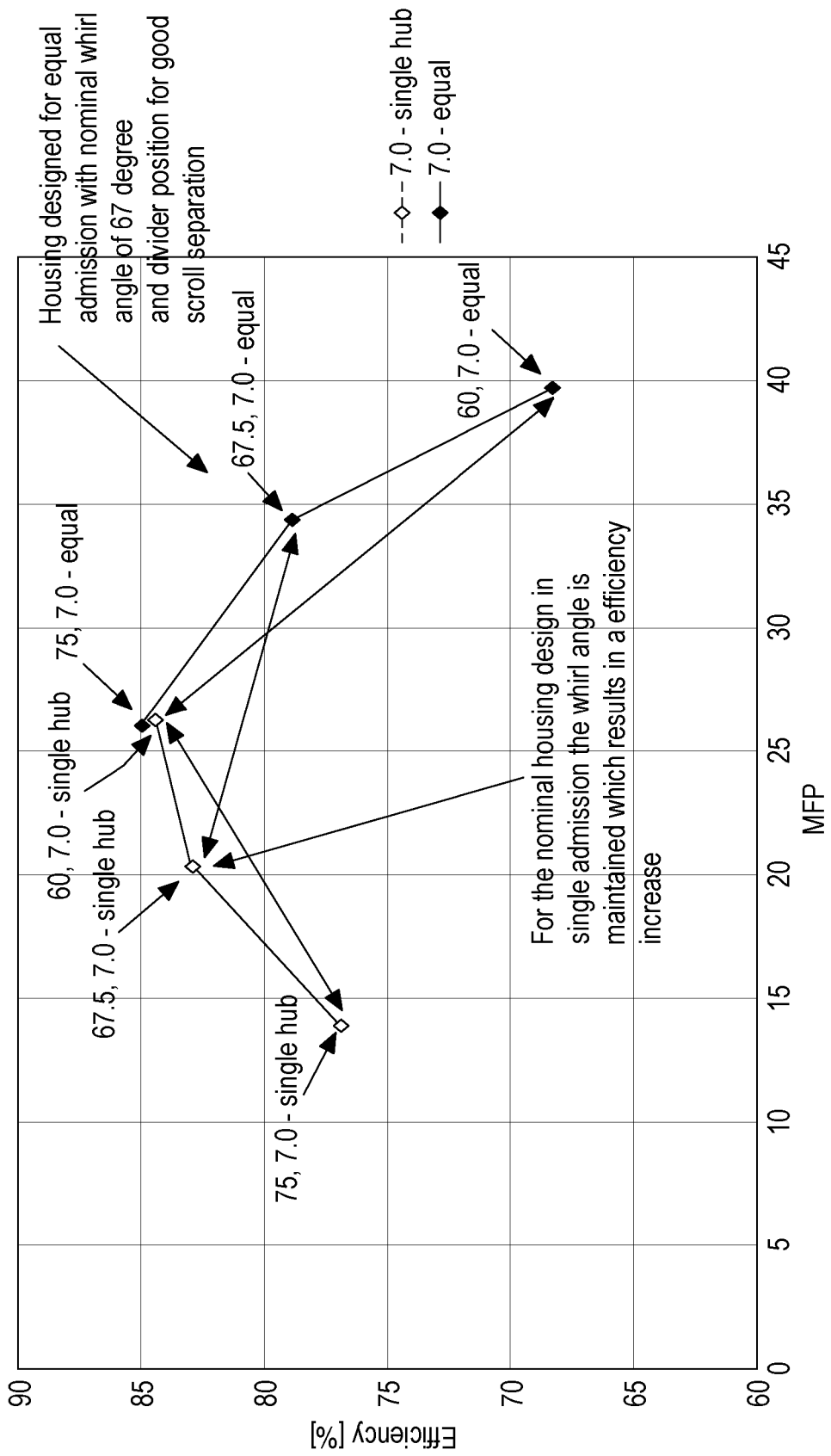
FIG. 7 shows the same curves of the efficiency of the turbine stage as a function of mass flow parameter (MFP) as shown in FIG. 5 with arrows added to show how points on the solid line (which represents equal admission) map onto points on the dashed line (which represents single admission) when there is good separation between the two volutes.

The implications of this are now briefly discussed with reference to FIGS. 6 and 7, which both show the same three curves of the efficiency of the turbine stage as a function of mass flow parameter (MFP) shown in FIG. 4.

As the turbine moves from equal admission to single admission, the turbine will move from a point on the curve representing equal admission (solid line) to one of two points on the single admission curve (dashed line).

If there is a sufficiently large distance between the tip 22 of the divider wall 20 and the turbine wheel tip 28 then even when operating in a single admission regime the exhaust gas will still be incident on the entire turbine wheel tip 28. In this case, the whirl angle will increase as the turbine moves from equal admission to single admission. Therefore, as indicated by the double-ended arrows in FIG. 6, a point on the solid line (which represents equal admission) corresponding to a given whirl angle will map onto a point on the dashed line (which represents single admission) that corresponds to a higher whirl angle. In the limit that the distance between the tip 22 of the divider wall 20 and the turbine wheel tip 28 becomes vanishingly small then when operating in a single admission regime the exhaust gas is only incident on half of the turbine wheel tip 28. In this case, the whirl angle will remain substantially the same as the turbine moves from equal admission to single admission. Therefore, as indicated by the double-ended arrows in FIG. 7, a point on the solid line (which represents equal admission) corresponding to a given whirl angle will map onto a point on the dashed line (which represents single admission) that corresponds to the same whirl angle.

It will be appreciated that in principle a turbocharger 1 may, in use, operate in a range of different regimes between the two extremes of equal and single admission. It will also be appreciated that some turbochargers may be optimised for a particular regime within this range. Since a range of different operating conditions is possible, a range of efficiencies of the turbine stage will be sampled during use. For example, a range of the curve shown in FIG. 5 will be sampled. As can be seen from FIGS. 6 and 7, the better the separation between the two volutes 19a, 19b, the smaller the range of the curve shown in FIG. 5 that is sampled will be.

Furthermore, it can be beneficial to optimise a turbocharger that can operate in single admission such that as the turbine moves (along the curve in FIG. 5) from equal admission to single admission, the curve is either flat or rises such that any reduction in mass flow parameter can be partially compensated for by an increase in efficiency (or, at least, is not compounded by a further reduction in efficiency).

Better volute 19a, 19b separation can also reduce the average pressure in the turbine housing (by preventing recirculation), which can improve the efficiency of an internal combustion engine connected thereto.

The inventor has realised that the dependence of the turbine stage efficiency on both: (a) the nozzle 27a, 27b widths and by increasing the whirl angle induced by the volutes 19a, 19b can be combined by considering a suitably defined effective area of the nozzles 27a, 27b, as now described with reference to FIGS. 8, 9A and 9B.

Figure 8:
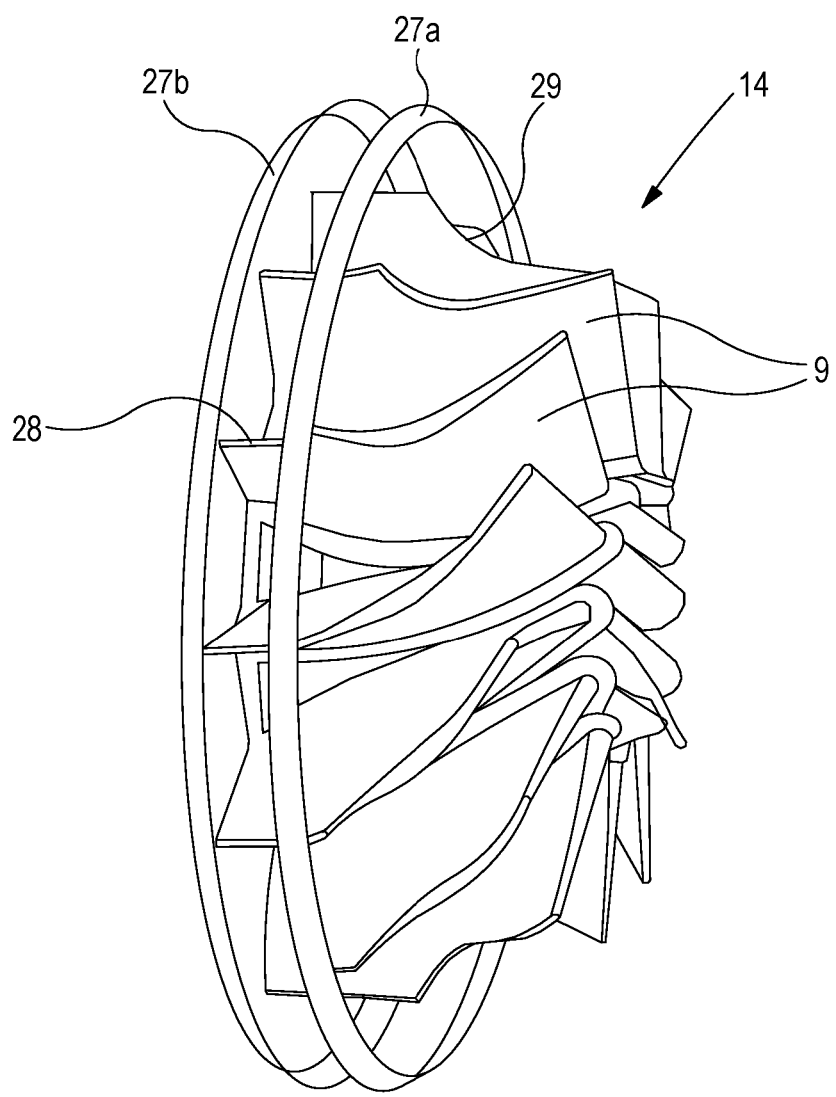
FIG. 8 shows a perspective view of a turbine wheel, the turbine housing having been removed so that the turbine wheel is visible but with the positions of the two nozzles of a twin-volute turbine housing are shown as two bands that surround the turbine wheel tip.

FIG. 8 shows a perspective view of the turbine wheel 14, the turbine housing 15 having been removed so that the turbine wheel 14 is visible. Although the turbine housing 15 has been removed in FIG. 8, the positions of the two nozzles 27a, 27b are shown as two bands that surround the turbine wheel tip 28. The inventor as realised that an increase in the whirl angle of flow through the nozzles 27a, 27b will reduce the effective area of the nozzles 27a, 27b. This can be best understood by considering FIGS. 9A and 9B.

Figure 9B:
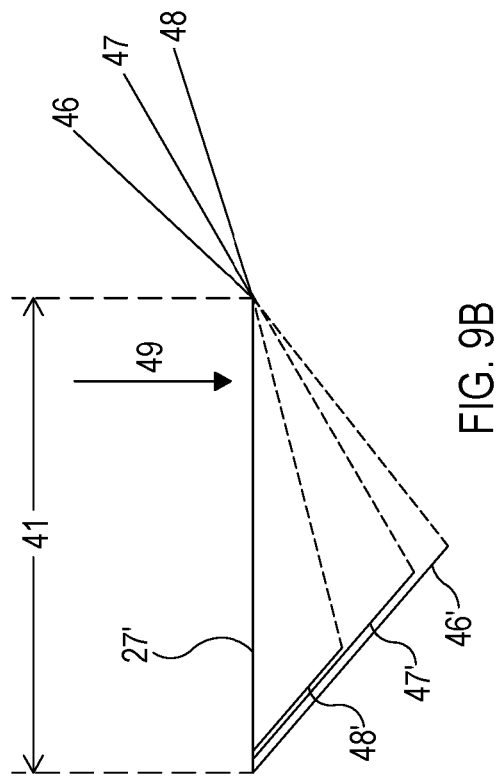
FIG. 9B shows a side view of the generally rectangular surface shown in FIG. 9A along with velocity vectors that represent three different whirl angles and a side view of the effective area of the nozzle for flow with each of these three whirl angle.
Figure 9A:
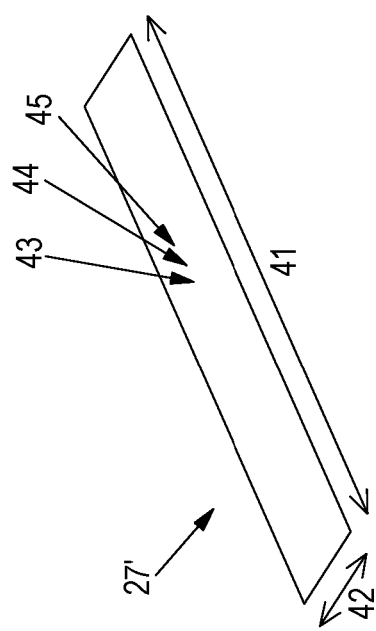
FIG. 9A shows a generally rectangular surface that corresponds to one of the bands that represents the nozzles of the twin-volute turbine housing as shown in FIG. 8 having been flattened out.

In FIG. 9A, one of the bands that represents the nozzles 27a, 27b has been flattened out such that it is a generally rectangular surface 27'. It will be appreciated that a first, longer dimension 41 of the rectangular surface 27' is given by the circumference of the nozzle 27a, 27b that it represents and that a second, shorter dimension 42 of the rectangular surface 27' is given by the width of the nozzle 27a, 27b. Three velocity vectors 43, 44, 45 are also shown that represent three different whirl angles. Note that with the nozzle being flattened out like this, the velocity vectors that are incident on different parts of the surface 27' for a given whirl angle are all parallel.

The effective area of the nozzle for flow with a given whirl angle is defined as the area of the generally rectangular surface 27' projected onto a plane perpendicular to the velocity vector representing that whirl angle.

FIG. 9B shows a side view of the generally rectangular surface 27' (the first, longer dimension 41 being in the plane of the page and the second, shorter dimension 42 being perpendicular to the plane of the page). Three velocity vectors 46, 47, 48 are also shown that represent three different whirl angles. In addition, and arrow 49 representing zero whirl angle is also shown. A side view of the effective area 46', 47', 48' of the nozzle for flow with each of the three whirl angle 46, 47, 48 is also shown on FIG. 9B. It can be seen from FIG. 9B that as the whirl angle increases the effective area decreases. It can be found that the effective area is given by:

$$A_{eff} = A_G \cos(\theta_w), \quad (3)$$

where $A_{eff}$ is effective area of nozzle, $A_G$ is the geometric area of the nozzle and $\theta_w$ is the whirl angle.

Since the effective area of nozzle is proportional to the cosine of the whirl angle and since $\cos(60)/\cos(75)=1.93$, which is approximately 2, increasing the whirl angle from 60° to 75° should be equivalent to approximately halving the geometric area (with a fixed whirl angle). This behaviour can be seen in FIG. 3, where the point representing a nozzle width of 7 mm and a whirl angle of 75° is on approximately the same position within the efficiency verses mass flow parameter curve as the point representing a nozzle width of 3.5 mm but at a whirl angle of 60°.

Figure 10:
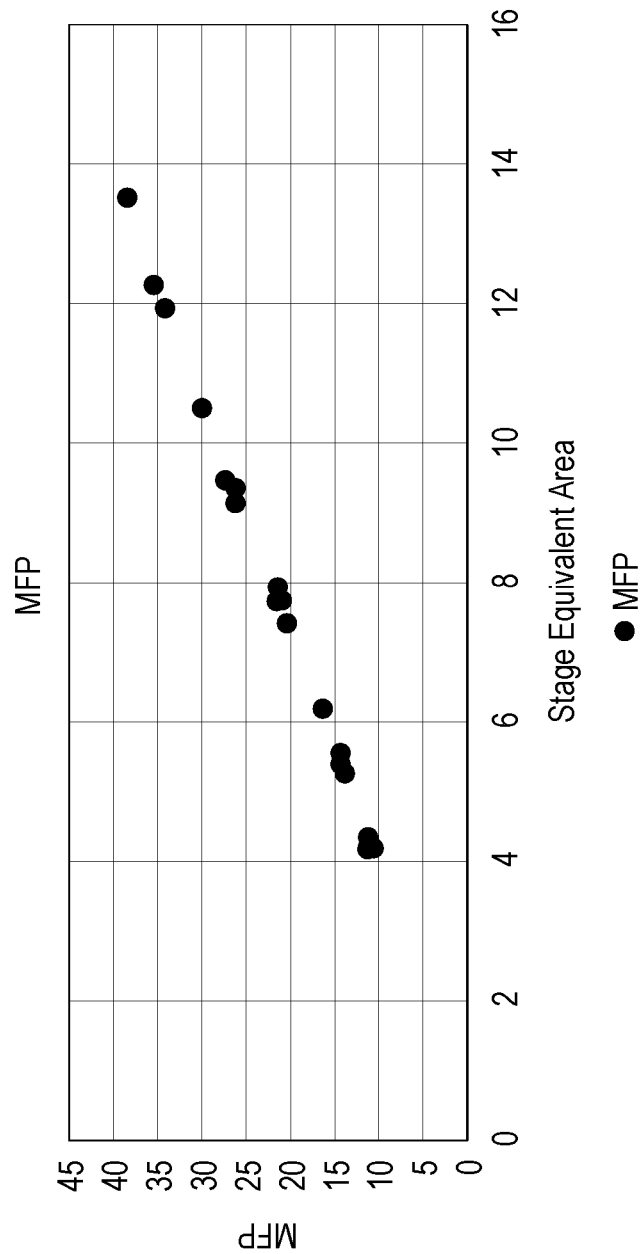
FIG. 10 shows a plot of the mass flow parameter (MFP) against a newly defined stage equivalent area, each of the data points in FIG. 10 representing a range of different nozzle widths, whirl angles and operating conditions (either equal admission, single admission with flow only through the either one of the volutes.

To provide further verification of this effective nozzle area, it can be used to determine an equivalent stage area for the turbine stage, by combining the effective area (as defined in equation (3)) with the area of the wheel (as two points in series):

$$\frac{1}{A_{stage}^2} = \frac{1}{A_{eff}^2} + \frac{1}{A_{wheel}^2} \quad (4)$$

where $A_{stage}$ is the equivalent stage area for the turbine stage, $A_{eff}$ is the effective area if the nozzle (defined by equation (3)) and $A_{wheel}$ is the area of the wheel (i.e. the throat area of the wheel). FIG. 10 shows a plot of the mass flow parameter (MFP) against the stage equivalent area. Each of the data points in FIG. 10 represents a different combination of nozzle width (either 3.5, 5.5 or 7 mm), whirl angle (either 60°, 67.5° or 75°) and operating conditions (either equal admission, single admission with flow only through the volute 19b or single admission with flow only through the volute 19a). Therefore there are 27 data points shown in FIG. 10. The fact that the plot of the mass flow parameter (MFP) against the stage equivalent area shows a linear correlation suggests that the use of the effective nozzle area correctly takes into account the dependency of this data on the whirl angle.

Figure 11:
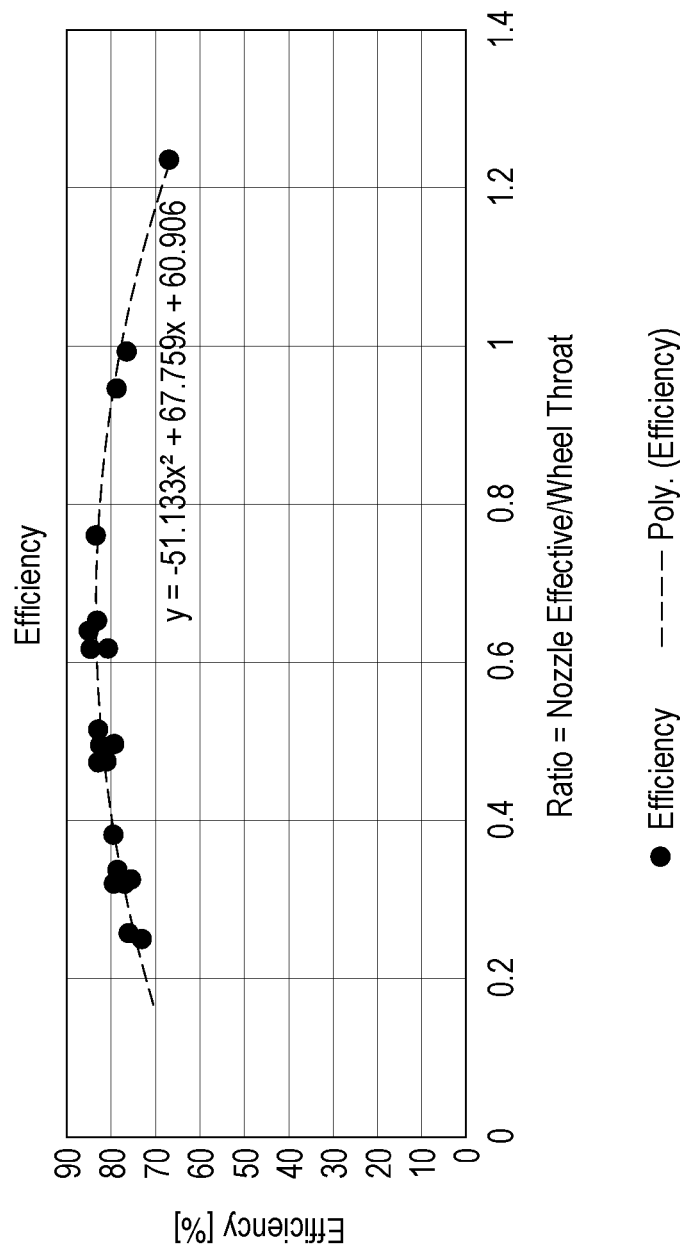
FIG. 11 shows a plot of the turbine stage efficiency against a ratio of: (a) a newly defined effective nozzle area to (b) the wheel throat area (also referred to as the critical area of the turbine wheel) for the same data points shown in FIG. 10.

FIG. 11 shows a plot of the turbine stage efficiency against a ratio of: (a) the effective nozzle area (as defined by equation (3)) to (b) the wheel throat area (also referred to as the critical area of the turbine wheel 14) for the same 27 data points shown in FIG. 10. Embodiments of the present disclosure involve the selection of a geometric nozzle width such that during use the turbine will operate (as it moves between equal and single admission conditions) a desired or target range of the curve shown in FIG. 11 is sampled.

Such methods allow for a combined optimisation of the turbine housing nozzle 27a, 27b width along with the whirl angle. It also allows one to take into account the effects of operating under equal admission, single admission, or in between these two extremes.

A method for determining a width of turbine nozzles 27a, 27b for turbine 11 is now described.

As an initial step, a relationship between the turbine stage efficiency and an effective nozzle area may be determined. In particular, the relationship between the turbine stage efficiency and the effective nozzle area may comprise a relationship between the turbine stage efficiency and a ratio of: (a) the effective nozzle area to (b) a wheel throat area. It will be appreciated that here a relationship between the turbine stage efficiency and an effective nozzle area may be of the form of the plot shown in FIG. 11.

As previously described in relation to FIG. 11, this relationship between the turbine stage efficiency and an effective nozzle area may be determined by simulating a range of different set points (for example the above-mentioned 27 data points), the set points having a range of different effective nozzle area. Determination of the relationship may involve plotting a graph of the set points and/or fitting a curve (for example a least squares polynomial fit) to the set points. It will be appreciated that such a relationship (for example a plot of the form of FIG. 11) may be determined once and subsequently used for determining a plurality of widths of a turbine nozzle for a turbine. That is, the relationship need not be determined for each turbine nozzle width determination.

Next, from this relationship between the turbine stage efficiency and the effective nozzle area, at least one target effective nozzle area is selected. The target effective nozzle area may be selected to achieve a desired turbine stage efficiency.

As previously explained, the effective nozzle area is dependent on both the geometric area of the at least one nozzle and the whirl angle (see equation (3)).

For a twin-volute turbine comprising two volutes, the geometric cross sectional area of the volutes is the total cross sectional area that is supporting exhaust gas flow. This will depend on the operating since, when under equal admission conditions, this area is the sum of the cross sectional areas of the two volutes, whereas when operating under single admission with flow only through one of the volutes this area is equal to the cross sectional area of one of the two volutes.

The whirl angle is dependent on the geometry of the at least one volute, the geometry of the turbine wheel and, in the case of poor separation between the two volutes of a twin-volute turbine, the flow conditions (i.e. whether the turbine stage operates under equal admission or single admission).

Therefore, in general, a range of target effective nozzle areas are selected from the relationship between the turbine stage efficiency and the effective nozzle area. This range of target effective nozzle areas will, in general, correspond to a range of set points of flow conditions (selected from a range of flow conditions between two end points of flow conditions, the end points of flow conditions being equal admission and single admission).

It will be appreciated that in general, for a twin-volute turbine, this range of target effective nozzle areas will, in general, be selected bearing in mind: the geometry of the two volutes, the geometry of the turbine wheel the range of flow conditions under which the turbine is expect to operate in during use. For example, it will be appreciated that, in general, a different the range may be selected for a turbine that is expected to operate mainly in equal admission to a turbine that is expected to operate mainly in single admission.

Next, in dependence on a whirl angle, the width of the turbine nozzle 27a, 27b is determined as a width that will achieve the range of target effective nozzle areas. In particular, this will typically involve determining the width of the turbine nozzle in dependence on the whirl angle for a set point of flow conditions as a width that will achieve the at least one target effective nozzle area for said set point of flow conditions. It will be appreciated that, as used in this context, a set point of flow conditions is intended to mean a set point selected from a range of flow conditions between two end points of flow conditions, the end points of flow conditions being equal admission and single admission.

In some embodiments, determination of the width of the turbine nozzle 27a, 27b may involve determining a plurality of widths of the turbine nozzle, each width being determined in dependence on the whirl angle for a set point of flow conditions as a width that will achieve the a target effective nozzle area for said set point of flow conditions. The width of the turbine nozzle 27a, 27b may be determined as an average of this plurality of widths.

The above-described method advantageously uses the newly defined effective nozzle area, which allows the turbine stage efficiency to be simultaneously optimised for both the width of the turbine nozzle and the whirl angle induced by the at least one volute.

As can be seen from FIG. 11, relatively high efficiency can be achieved by sizing the widths of the turbine nozzle 27a, 27b such that a ratio of an effective nozzle area to a wheel throat area in the range 0.4 to 1.0 is achieved. More preferably, the width of the turbine nozzle may be sized such that the ratio of effective nozzle area to wheel throat area in the range 0.5 to 0.9. Even more preferably, the width of the turbine nozzle may be sized such that the ratio of effective nozzle area to wheel throat area in the range 0.6 to 0.8. Even more preferably, the width of the turbine nozzle may be sized such that the ratio of effective nozzle area to wheel throat area is approximately 0.7.

The nozzle may be sized such that the ratio of effective nozzle area to wheel throat area is in one of the above-mentioned range over substantially the entire range of flow conditions between two end points of flow conditions, the end points of flow conditions being equal admission and single admission. Alternatively, the nozzle may be sized such that the ratio of effective nozzle area to wheel throat area is in one of the above-mentioned range over a sub-range of flow conditions between two end points of flow conditions (the end points of flow conditions being equal admission and single admission) that the turbine 11 is expected to normal operate in.

Although the disclosure has been described in relation to a turbine which may form part of a turbocharger, in other embodiments the turbine may form part of any appropriate turbomachine.

Furthermore, although the disclosure has been described in relation to a twin entry turbine (i.e. one with two volutes), it may equally be applied to turbines having more than two volutes.

The invention claimed is:

1. A method for designing a turbine housing for a turbine, the method comprising determining a width of a turbine nozzle defined by the turbine housing, the turbine comprising a turbine wheel for rotation within a turbine housing, the turbine housing including at least one volute arranged to deliver a fluid to the turbine wheel via the turbine nozzle, the method comprising:
    selecting from a relationship between a turbine stage efficiency and an effective nozzle area, at least one target effective nozzle area, wherein the effective nozzle area is dependent on both the width of the turbine nozzle and a whirl angle induced by the at least one volute; and
    determining in dependence on the whirl angle, the width of the turbine nozzle as a width that will achieve the at least one target effective nozzle area.

2. The method of claim 1 further comprising determining the relationship between the turbine stage efficiency and the effective nozzle area from which the at least one target effective nozzle area is determined.

3. The method of claim 1 wherein the effective nozzle area is proportional to a product of the width of the turbine nozzle and a cosine of the whirl angle.

4. The method of claim 1 wherein the turbine is a twin-volute turbine comprising two volutes.

5. The method of claim 4 when wherein determining the width of the turbine nozzle in dependence on the whirl angle involves determining the width of the turbine nozzle in dependence on the whirl angle for a set point of flow conditions as a width that will achieve the at least one target effective nozzle area for said set point of flow conditions.

6. The method of claim 1 wherein a range of target effective nozzle areas are selected from the relationship between the turbine stage efficiency and the effective nozzle area.

7. The method of claim 1 wherein the relationship between the turbine stage efficiency and the effective nozzle area comprises a relationship between the turbine stage efficiency and a ratio of (a) the effective nozzle area to (b) a wheel throat area.

8. A method for determining a width of a turbine nozzle for a turbine, the turbine comprising a turbine wheel for rotation within a turbine housing, the turbine housing including at least one volute arranged to deliver a fluid to the turbine wheel via the turbine nozzle, the method comprising:
    determining in dependence on whirl angle induced by the at least one volute, the width of the turbine nozzle as a width that will achieve a ratio of an effective nozzle area to a wheel throat area in the range 0.4 to 1.0, wherein the effective nozzle area is a product of the width of the turbine nozzle and a cosine of the whirl angle.

9. The method of claim 8 wherein the turbine is a twin-volute turbine comprising two volutes.

10. The method of claim 9 when the width of the turbine nozzle is determined so as to achieve a ratio of an effective nozzle area to a wheel throat area in the range 0.4 to 1.0 for a range of flow conditions between two end points of flow conditions, the end points of flow conditions being equal admission and single admission.

11. A computer readable medium carrying a computer program comprising computer readable instructions configured to cause a computer to carry out a method according to claim 1.

12. A computer apparatus comprising:
a memory storing processor readable instructions, and
a processor arranged to read and execute instructions stored in said memory, wherein said processor readable instructions comprise instructions arranged to control the computer to carry out the method according to claim 1.

13. A computer readable medium carrying a computer program comprising computer readable instructions configured to cause a computer to carry out a method according to claim 8.

14. A computer apparatus comprising:
a memory storing processor readable instructions, and
a processor arranged to read and execute instructions stored in said memory, wherein said processor readable instructions comprise instructions arranged to control the computer to carry out the method according to claim 8.

15. A method for determining a width of a turbine nozzle for a fixed geometry turbine, the turbine comprising a turbine wheel for rotation within a turbine housing, the turbine housing including at least one volute arranged to deliver a fluid to the turbine wheel via the turbine nozzle, the method comprising:

selecting from a relationship between a turbine stage efficiency and an effective nozzle area, at least one target effective nozzle area, wherein the effective nozzle area is dependent on both the width of the turbine nozzle and a whirl angle induced by the at least one volute; and determining in dependence on the whirl angle, the width of the turbine nozzle as a width that will achieve the at least one target effective nozzle area.

16. The method of claim 15 further comprising determining the relationship between the turbine stage efficiency and the effective nozzle area from which the at least one target effective nozzle area is determined.

17. The method of claim 15 wherein the effective nozzle area is proportional to a product of the width of the turbine nozzle and a cosine of the whirl angle.

18. The method of claim 15 wherein the turbine is a twin-volute turbine comprising two volutes.

19. The method of claim 18 when wherein determining the width of the turbine nozzle in dependence on the whirl angle involves determining the width of the turbine nozzle in dependence on the whirl angle for a set point of flow conditions as a width that will achieve the at least one target effective nozzle area for said set point of flow conditions.

20. The method of claim 15 wherein a range of target effective nozzle areas are selected from the relationship between the turbine stage efficiency and the effective nozzle area.

21. The method of claim 15 wherein the relationship between the turbine stage efficiency and the effective nozzle area comprises a relationship between the turbine stage efficiency and a ratio of (a) the effective nozzle area to (b) a wheel throat area.

\* \* \* \* \*